United States Patent [19]

Junkermann

[11] Patent Number: 4,483,070
[45] Date of Patent: Nov. 20, 1984

[54] PORTABLE BACKPACKED CUTTER

[75] Inventor: Howard C. Junkermann, Fairfax, Va.

[73] Assignee: Joane G. Tannehill, Staunton, Va.; a part interest

[21] Appl. No.: 420,896

[22] Filed: Sep. 21, 1982

[51] Int. Cl.³ .............................................. B26B 27/00
[52] U.S. Cl. ..................................... 30/296 R; 30/276; 224/185; 224/262; 248/328
[58] Field of Search ...................... 30/296 R, 276, 231, 30/272 A, 264, 287; 224/922, 185, 262; 248/295.1, 328, 274, 297.1, 297.2

[56] References Cited

U.S. PATENT DOCUMENTS

| | | | |
|---|---|---|---|
| 2,583,113 | 1/1952 | Mogel | 30/287 X |
| 2,780,666 | 6/1956 | Teagle | 30/231 X |
| 2,792,670 | 5/1957 | Haynes | 30/276 |
| 3,219,129 | 11/1965 | Yamada | 30/296 R X |
| 3,346,955 | 10/1967 | Beneke | 30/276 |
| 3,540,123 | 11/1970 | Yamada | 30/276 |
| 3,964,182 | 6/1976 | Pomeret et al. | 224/262 |
| 4,341,017 | 7/1982 | Janczak | 30/296 |

FOREIGN PATENT DOCUMENTS 856532 9/1952 Fed. Rep. of Germany ........ 30/231

Primary Examiner—E. R. Kazenske
Assistant Examiner—Douglas D. Watts
Attorney, Agent, or Firm—Wilkinson, Mawhinney & Theibault

[57] ABSTRACT

The present disclosure is directed to a portable cutter particularly useful in trimming and shaping standing growing trees of the evergreen type which has a cutting head mounted on one end of a rod, and a pistol grip type control handle on the other end. A second handle is secured on the rod substantially midway between the control handle and cutting head. A back pack having partial waist encircling support means with a belt and a securing buckle is provided with a pair of spaced apart vertical standards secured to said encircling support having a transverse connector therebetween above said waist support. The back pack is retained on the operator by a pair of shoulder strap connector means attached to each end of center of said transverse connector and connectable to said waist support. Back pack extension and guide means is carried by and secured to at least one of the vertical standards. A cutter suspension shock cord is adapted to be connected between the back pack extension and the cutter rod proximate the cutting head and being adjustable along the rod to permit adjustability for varying the apparent weight of the cutter from an apparent zero to an amount desired by the operator to provide maximum maneuverability with a minimum of operator fatigue. The prime mover is carried by the back pack above the waist encircling support and supplies power to a motor connected to drive the cutting head and being carried thereby. There is a selectively operable control connected between the prime mover and motor for selectively driving the motor under control of the pistol grip control handle.

8 Claims, 5 Drawing Figures

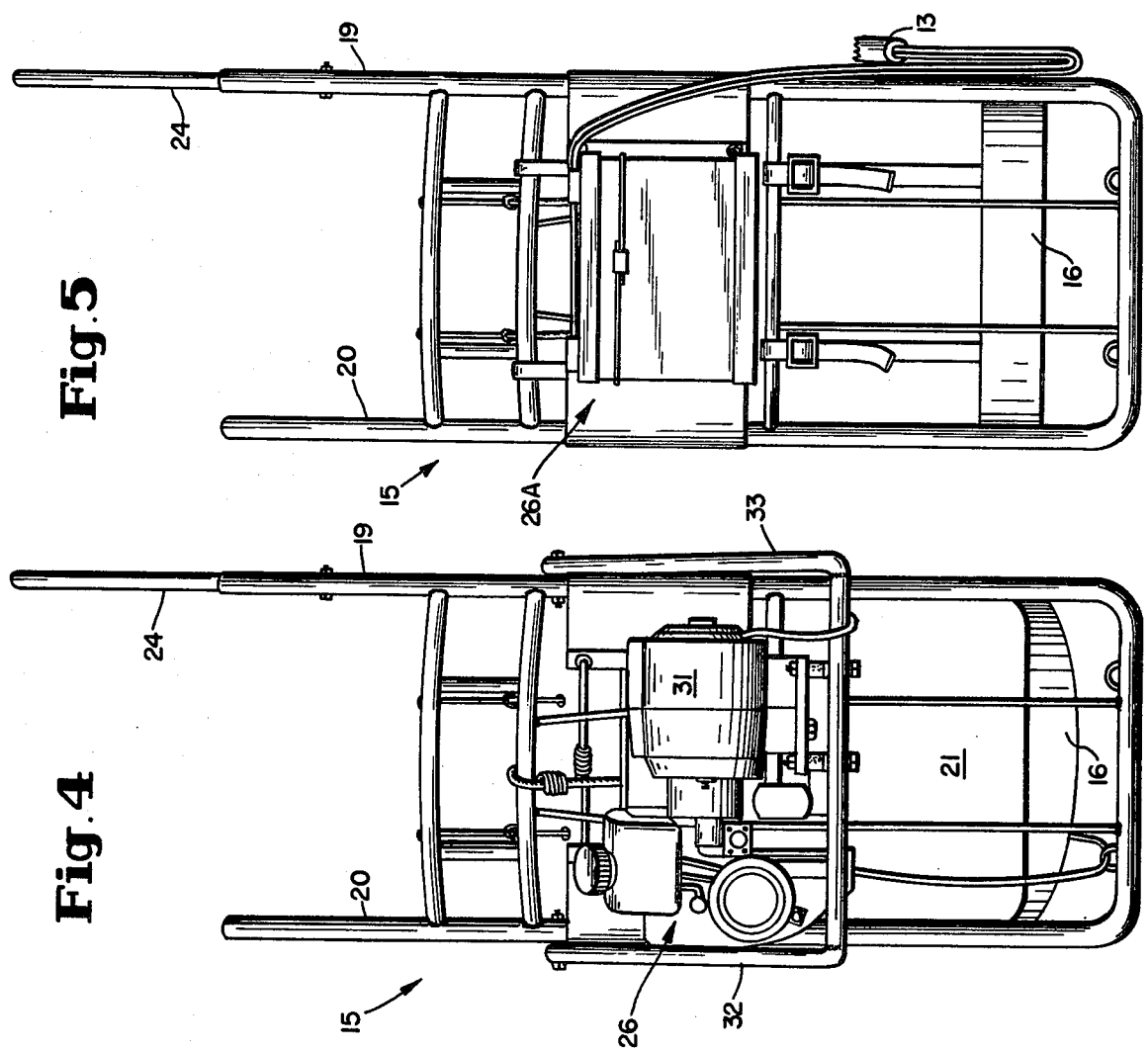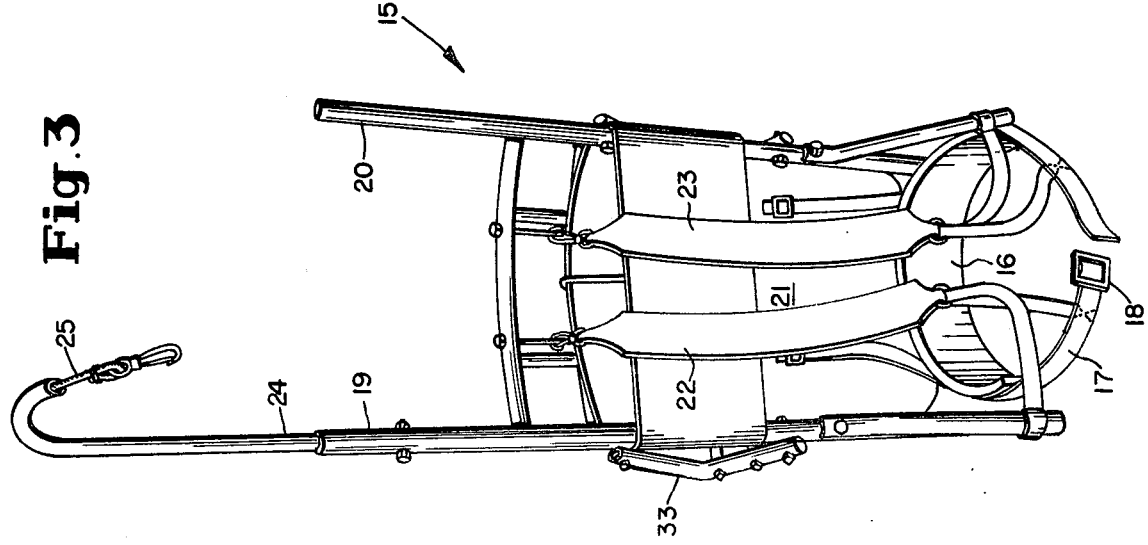

PORTABLE BACKPACKED CUTTER

TECHNICAL FIELD

My invention relates to tree and hedge trimming cutters which are supported counterbalanced from a backpack having a vertical forwardly bent extension. The backpack also carries a prime mover supplying power to selectively drive a cutter. The cutter head support rod is connected to be carried by the backpack vertical extension by an elastomeric resiliently stretchable shock cord spring precoil mechanism so that the weight of the cutter may be adjusted along the support rod for varying the weight of the cutter to provide maximum maneuverability at various heights with minimum operator fatigue by allowing a large portion of the load to be supported on the operator's hips rather than shoulders thereby reducing back fatigue.

BACKGROUND ART

Heretofore many forms of apparatus have been devised to permit man to take to the field, woods or other outside environment and cut, trim or shape trees where he had to bodily carry his own power supply with him. The closest art known to me prior to this invention and application are:
German Pat. No. 856,532, 1952
U.S. Pat. No. 2,750,666, 1956
U.S. Pat. No. 2,792,670, 1957
U.S. Pat. No. 3,346,955, 1967
U.S. Pat. No. 3,540,123, 1970
U.S. Pat. No. 4,341,017, 1982

DISCLOSURE OF THE INVENTION

In accordance with my invention I provide a trimmer cutting head powered by a prime mover which is mounted on a rod extending from a pistol grip type control handle. To provide additional maneuvering control of the cutting head, a handle is also mounted approximately midway along the rod. The cutting head, motor, rod and handle forms an assembly referred to as the cutter. The cutter is suspended by appropriate size shock cord from a backpack extension. The tension of the shock cord is operator adjustable to permit the operator to change the apparent weight of the cutter on the operator's arms and hands. The adjustment is variable from an apparent weight of zero to an amount desired by the operator for adequate control, maneuvering and type of cutting; i.e., vertical, horizontal and/or angular. This allows the operator a high degree of individual control and greatly reduces operator fatigue in comparison to hand trimming methods or unsupported cutters.

An object of the invention is to provide an appropriate degree of resiliency in the movement of the cutter from ground level to the maximum reach of the cutter. The suspension shock cord is connected from within the backpack frame, up through the extension tube and guide, thence to a swiveled pulley located on the main part of the cutting head, then back along the rod to a pulley on the forward part of the control handle and then forward to an adjustable fitting on the rod so that small changes in tension can be made yet provide resilience throughout the cutting area.

Another object of the present invention is to provide a backpack which carries the motor power source, i.e., battery or motor generator with appropriate connectors fastened to the backpack frame. The backpack and weight of the power source functions as a counter balance and restraining component for anchoring the top end of the shock cord suspension system. The backpack is a type which allows approximately 60% of the load to be supported on the operator's hips rather than shoulders thereby reducing back fatigue.

A still further object of the present invention is to provide a cutting head which is a specially designed and constructed combination comb and cutting blade. The design of the three arms of the cutting blade being angled in such a manner that the arms capture a branch, twig or weed that comes within the teeth of the comb and tend to pull them inward against the comb tooth or the circular opening at the base of each tooth. This cutting action of the blade is substantially parallel to the comb teeth or tangent to the circumference of the circular openings. By this action a clean cut is realized on a wide variety of plant growth. The sides of the comb are bent down ninety degrees to act as a guide to assure that only items to be cut come within the action of the blades thereby reducing blade fouling and protecting the operator from pieces of the cuttings. They also keep the cutting blade from touching the ground or other obstructions.

Another object of the present invention is to provide a cutting blade which will permit cuts in either direction and at varying heights. The angle of the cutting head is adjustable by a joint in the rod next to the comb which permits the operator to change the angle of the cutting head to that best suited to a particular type of trimming operation and the rod can be telescoped to various lengths best suited for each particular cutting operation.

The apparatus of the present invention is particularly useful for shearing commercially grown species of Christmas Trees. The operator with minimum experience can maintain and cut the designed conical shape with any angle desired in an easy up and down motion. The device allows the operator to trim from ground level up to approximately ten feet without an elevated platform. It is useful in trimming other ornamental trees, bushes and large hedges without the use of ladder, etc. The device is backpacked, therefore very portable and useful in many different types of situations and terrain.

BRIEF DESCRIPTION OF THE DRAWINGS

FIG. 3 is a front perspective view of the back pack and cutter support of the present invention.

FIG. 4 is a rear elevational view of the back pack and prime mover of the apparatus of FIG. 1.

FIG. 5 is a rear elevational view of the backpack showing battery prime mover.

BEST MODE FOR CARRYING OUT THE INVENTION

Figure 1:
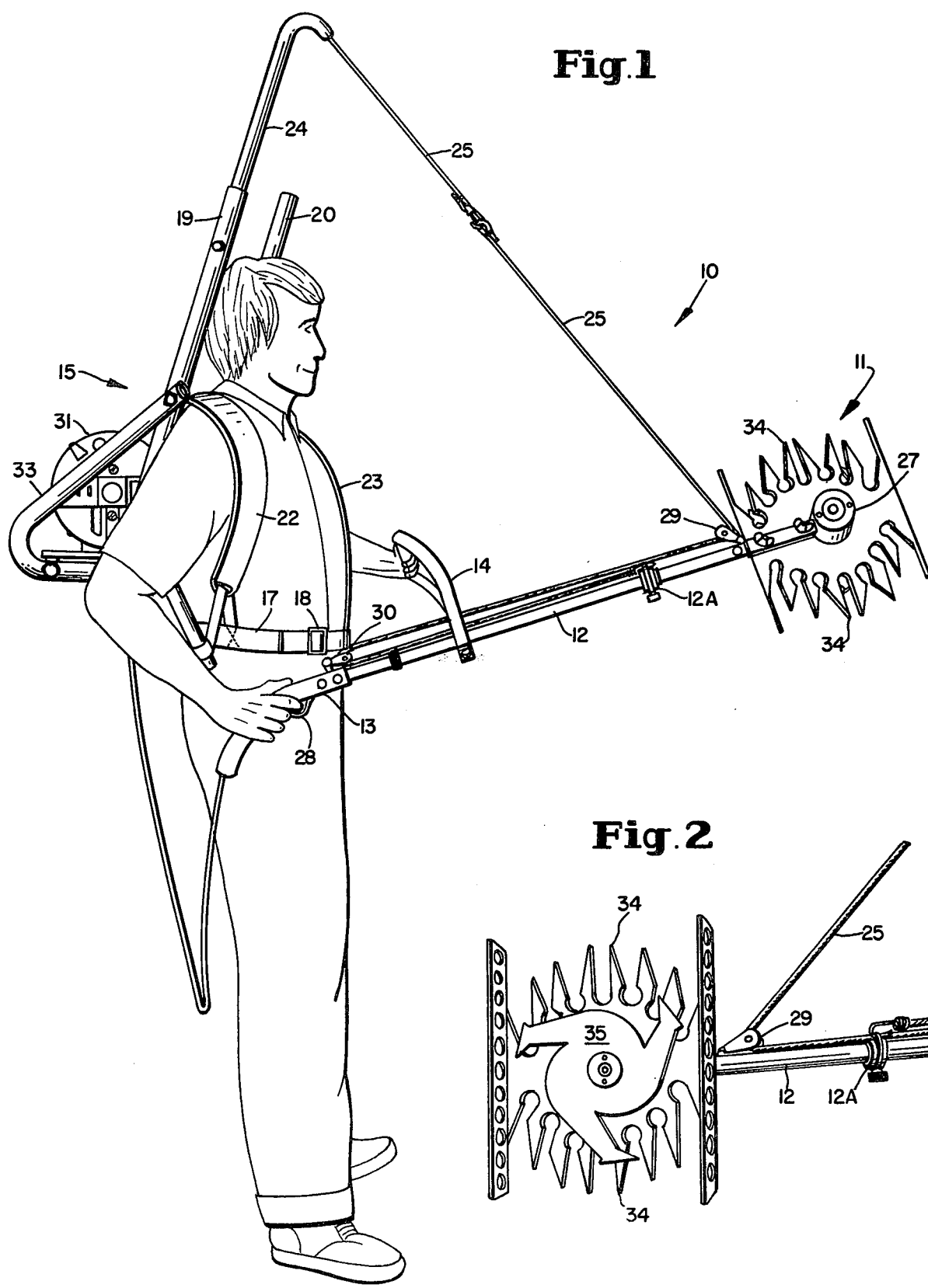
FIG. 1 is a perspective view of the portable back packed cutter of the present invention donned by an operator ready for tree trimming.
Figure 2:
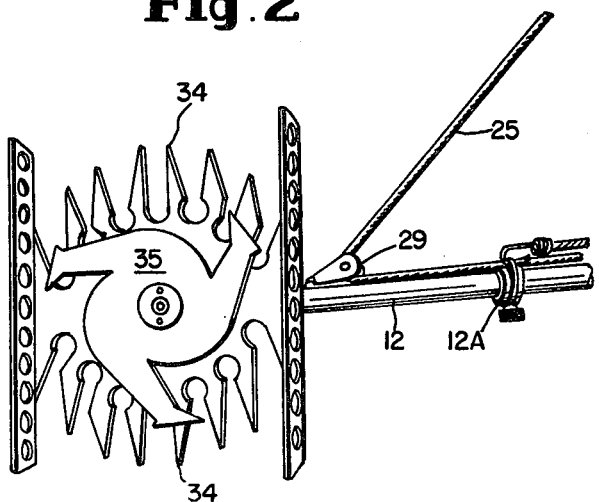
FIG. 2 is a fragmentary underside view of the cutting head of the present invention.

Referring now to the drawings, the portable cutter assembly 10 is shown as having a cutting head 11 mounted on one end of a rod 12, having pistol grip type control handle 13. The cutting head 11 is mounted on the other end of the rod 12. A handle 14 is carried by rod 12 and is positioned substantially midway between the control handle 13 and cutting head 11. A back pack 15 is shown as having a partial waist encircling support means 16 with a belt 17 and a securing buckle 18. A pair of spaced apart vertical standards 19, 20 are secured to the encircling support 16 and have a transverse connector 21 therebetween above the waist support 16. A pair of shoulder strap connector means 22, 23 are attached to each end of center of the transverse connector 21 and are connectable to the waist support 16. A back pack extension and guide 24 is shown carried by and secured to at least one of the vertical standards 19, 20. A cutter suspension shock cord 25 is adapted to be connected between the back pack extension 24 and the cutter rod 12 proximate the cutting head 11 and is adjustable along the rod 12 by lockable collar 12A to permit varying the weight of the cutter assembly 10 from an apparent zero to an amount desired by the operator-carrier to provide maximum maneuverability of the assembly 10 with a minimum of operator fatigue. A prime mover 26 is carried by the back pack 15 above the waist encircling support 16. A motor 27 is connected to drive the cutting blade 11 and is carried thereby. A selectively operable trigger control switch 28 is connected between said prime mover 26 and motor 27 for selectively driving the motor 27 under control of said pistol grip control handle 13. The backpack extension and suspension guide 25 is a tubular extension forwardly bent and receivable and adapted to be anchored in one of the vertical standards 19 or 20. A portion of the cutter suspension shock cord 25 is anchored to and extends from within the extension 24. Whether or not the tubular extension 25 is inserted in standard 19 or 20 depends upon whether the operator is right or left handed.

The suspension shock cord 25 is of the elastomeric resiliently stretchable type which passes beneath a swivel pulley 29 which is connected adjacent the cutting head 11 and is passed over a pulley 30 secured to the rod 12 adjacent the piston grip 13 and is anchored to the collar 12A which is slidable and selectively positionable and lockable along the rod 12 to vary the weight of the cutter assembly 10 to reduce operator fatigue to a minimum. The prime mover 26 is a gasoline engine powered alternator 31 mounted on a pair of mount brackets 32, 33 secured between the vertical standards 19, 20 of the back pack 15. The selectively operable control means is a trigger actuated switch on the pistol grip 13 which is in circuit between the prime mover 25 and cutting head motor 27.

The prime mover 26 while being shown as a gasoline engine driven alternator may be a battery pack of either the primary or secondary type.

The cutter head 11 has static comb teeth 34 extending to each side of the rod 12, a three bladed cutter 35 is secured to be driven by the motor 27. The comb means 34 to each side of the cutter 11 are bent downwardly ninety degrees to act as guides so that only items to be cut are within the action of the blades 35. The cutting head adjusting means between the rod 12 and comb 34 permits the angle of the cutting head 11 to be varied to best suit a particular type of trimming operation.

OPERATION

The apparatus of this invention is particularly useful for shearing commercially grown species of Christmas Trees. The cutter operator with minimum experience can maintain and cut the desired conical shape with any angle desired in an easy up and down motion. The apparatus allows the operator to trim from ground level up to approximately ten feet without an elevated platform. The structure is useful in trimming other ornamental trees, bushes and large hedges without the use of ladder, etc. Because the device is backpacked, and is therefore very portable, it is operable in many different types of situations and terrain.

The tension of the shock cord 25 is operator adjustable to permit the operator to change the apparent weight of the cutter 10 on the operator's arms and hands. The adjustment is variable from an apparent weight of zero to an amount desired by the operator for adequate control, maneuvering and type of cutting; i.e., vertical, horizontal and/or angular. This allows the operator a high degree of individual control and greatly reduces operator fatigue in comparison to hand-trimming methods or extended and unsupported cutting heads.

To provide an appropriate degree of resiliency in the movement of the cutter 10 from ground level to the maximum reach of the cutter, the suspension shock cord 25 is connected from within the backpack frame 15 up through the extension tube and guide 24, thence to a swiveled pulley 29 located on the main part of the cutting head 11, then back along the rod 12 to a pulley 30 on the forward part of the pistol grip control handle 13 and then forward to an adjustable fitting 12A on the rod 12 so as to permit a change in tension to be made.

The mount for the motor 27 is designed and constructed to support the motor 27 on the comb 34, securely mounted to the control handle rod 12 to provide a connection for the shock cord suspension pulley 29 and to provide a recess for the specially designed hub for the cutting blade 35. The blade support hub is mounted on the motor output shaft in a manner which allows the cutting blade 35 to be placed close to the front of the comb 34. The hub extends through a circular opening in the comb and into the recess of the motor mount. Just clearing the back of the comb 34 there is a flange on the hub of a diameter larger than the hole through the comb 34 but slightly smaller than the diameter of the recess in the motor mount. The flange is designed to retain and act as a brake on the cutting blade 35 if the motor shaft 27 should break away or in the event the retaining nuts on the shaft or tension pin loosen or break. In addition, the cutting blade 35 is secured to the hub by screws to prevent unwanted separation. The hub flange has two holes cut into it so that a medium size screw driver may be inserted through the hole in the motor mount to hold the hub while changing cutting blades 35.

The cutter assembly 10 is first connected to the backpack extension and guide 24 by securing the suspension shock cord 25 to the shock cord extending from the backpack extension and guide. This is after the operator has donned the backpack 15 by passing his arms through the shoulder straps 22, 23 and fastening the belt buckle 18. The output of the battery or alternator 31 is then connected to the pistol grip trigger switch 28 which is in circuit to energize or de-energize the cutter head motor 27. The prime mover is then ready and the device is operated to cut and trim the trees or other plant growth as desired.

What is claimed:
1. In combination, a portable cutter having:
 (a) a cutting head mounted on one end of a rod,
  and a piston grip type control handle means on the other end of said rod,
  and having a second handle means on said rod substantially midway between the control handle and cutting head,
 (b) a back pack having partial waist encircling support means with belt and a securing buckle, a pair of spaced apart vertical standards secured to said encircling support having a transverse connector therebetween above said waist support, a pair of shoulder strap connector means attached to each end of center of said transverse connector and connectable to said waist support, back pack extension and guide means carried by and secured to at least one of said vertical standards, (c) elastomeric cutter suspension shock cord connected between said back pack extension and guide means and said cutter rod proximate the cutting head (d) a prime mover carried by said back pack above said waist encircling support means, (e) motor means connected to drive said cutting head and being carried thereby, (f) and selectively operable switch control means connected between said prime mover and motor means for selectively driving the motor means under control of said pistol grip control handle (g) wherein said suspension shock cord extends from the back pack extension and guide means, passes over a pulley connected to the back of the cutting head along the control rod to a pulley secured to a forward portion of the pistol grip handle on the control rod and then to an adjustable collar means between said pulleys which is positionable along the control rod to allow the apparent weight of the cutting head combination and control rod, on the arms of the operatior, to be varied from zero to that desired by the operator based upon cutting conditions, thus affording the operator maximum maneuverability and minimum fatigue.

2. A portable cutter as claimed in claim 1 wherein the prime mover is a gasoline engine powered alternator mounted on a pair of mount brackets secured between the vertical standards of said back pack.

3. A portable cutter as claimed in claim 1 wherein said selectively operable control means is a trigger actuated switch on the pistol grip and being in circuit between said prime mover and cutting head motor means.

4. A portable cutter as claimed in claim 1 wherein the prime mover is a battery.

5. A portable cutter as claimed in claim 1 wherein the cutting head has static comb teeth extending to each side of the rod, a three bladed cutter secured to be driven by the motor means, comb means to each side of said cutter being bent down ninety degrees to act as a guide so that only items to be cut are within the action of the blades, and cutting head adjusting means between said rod and comb to permit the angle of the cutting head to be varied to best suit a particular type of trimming operation.

6. In combination, a portable cutter having:
(a) a cutting head mounted on one end of a rod,
and a pistol grip type control handle means on the other end of said rod,
and having a second handle means on said rod substantially midway between the control handle and cutting head,
(b) a back pack having
partial waist encircling support means with belt and a securing buckle,
a pair of spaced apart vertical standards secured to said encircling support having a transverse connector therebetween above said waist support,
a pair of shoulder strap connector means attached to each end of center of said transverse connector and connectable to said waist support,
back pack extension and guide means comprising a tubular extension received and anchored in one of said vertical standards,
(c) elastomeric cutter suspension shock cord connected between said tubular extension and said cutter rod proximate the cutting head and being adjustable along said rod to permit adjustability for varying the weight of said cutter from an apparent zero to an amount desired by the operator thereby reducing operator fatigue to a minimum,
(d) a prime mover carried by said back pack above said waist encircling support means,
(e) motor means connected to drive said cutting head and being carried thereby,
(f) and selectively operable switch control means connected between said prime mover and motor means for selectively driving the motor means under control of said pistol grip control handle.

7. A portable cutter as claimed in claim 6 wherein a portion of the cutter suspension shock cord is anchored to and extends from within said extension and guide means.

8. A portable cutter as claimed in claim 6 wherein the suspension shock cord passes beneath a swivel pulley connected adjacent said cutting head is passed over a pulley secured to said rod adjacent said pistol grip and is anchored to a collar means slidably selectively positionable along said rod to vary the weight of said cutter to reduce operator fatigue to a minimum.

* * * * *